United States Patent
Lei et al.

(10) Patent No.: US 11,304,136 B2
(45) Date of Patent: Apr. 12, 2022

(54) WIRELESS COMMUNICATION METHOD AND COMMUNICATION DEVICE

(71) Applicant: MediaTek Singapore Pte. Ltd., Singapore (SG)

(72) Inventors: Bo Lei, Chengdu (CN); Kung-Shuan Huang, Changhua County (TW)

(73) Assignee: MEDIATEK SINGAPORE PTE. LTD., Singapore (SG)

(*) Notice: Subject to any disclaimer, the term of this patent is extended or adjusted under 35 U.S.C. 154(b) by 0 days.

(21) Appl. No.: 16/134,884

(22) Filed: Sep. 18, 2018

(65) Prior Publication Data
US 2019/0090187 A1  Mar. 21, 2019

(30) Foreign Application Priority Data
Sep. 19, 2017  (CN) .......................... 201710850155.8

(51) Int. Cl.
*H04W 52/02* (2009.01)
*H04B 17/309* (2015.01)

(52) U.S. Cl.
CPC ...... *H04W 52/0216* (2013.01); *H04B 17/309* (2015.01); *H04W 52/0222* (2013.01); *H04W 52/0248* (2013.01); *Y02D 30/70* (2020.08)

(58) Field of Classification Search
CPC ............. H04W 52/00–0296; H04B 17/30–391
See application file for complete search history.

(56) References Cited

U.S. PATENT DOCUMENTS 6,804,542 B1   10/2004 Haartsen
8,060,054 B1 * 11/2011 Dinan ............... H04W 52/0216
                                                    455/343.4

2002/0123347 A1 *  9/2002 Chambers .......... H04B 7/18534
                                                    455/435.1
2005/0169201 A1   8/2005 Huylebroeck
2006/0083168 A1 *  4/2006 Prakash .................. H04L 1/205
                                                    370/230

(Continued)

FOREIGN PATENT DOCUMENTS

CN   101009587 A   8/2007
CN   102474279 A   5/2012

(Continued)

OTHER PUBLICATIONS

"Specification of the Bluetooth System;" Specification vol. 0; Covered Core Package version 4.2; Dec. 2014.

*Primary Examiner* — Michael Thier
*Assistant Examiner* — Prince A Mensah
(74) *Attorney, Agent, or Firm* — McClure, Qualey & Rodack, LLP

(57) ABSTRACT

The present invention provides a wireless communication method, a communication device, and a device having a storage function. The wireless communication method in the embodiment of the present invention comprises: a first device waking up with a predetermined wake-up interval, and receiving data packets from a second device; determining a time interval between two consecutive data packets received; determining whether the time interval is higher than the wake-up interval of the first device; and if the time interval is higher than the wake-up interval, the first device increasing the wake-up interval. In this way, the present invention can reduce the communication power consumption of the wireless device.

19 Claims, 5 Drawing Sheets

(56) References Cited

U.S. PATENT DOCUMENTS

| | | | | |
|---|---|---|---|---|
| 2006/0111062 A1* | 5/2006 | Cunningham | .... | H04W 52/0225 455/152.1 |
| 2007/0242634 A1* | 10/2007 | Calcev | ...... | H04W 52/0225 370/318 |
| 2007/0297438 A1* | 12/2007 | Meylan | ...... | H04W 52/0225 370/445 |
| 2009/0196212 A1* | 8/2009 | Wentink | ...... | H04W 52/0235 370/311 |
| 2010/0041445 A1* | 2/2010 | Qi | ...... | H04W 52/0251 455/574 |
| 2010/0157863 A1* | 6/2010 | Gong | ...... | H04W 52/0216 370/311 |
| 2011/0116427 A1* | 5/2011 | Chang | ...... | H04W 52/0216 370/311 |
| 2011/0176465 A1* | 7/2011 | Panta | ...... | H04W 52/0235 370/311 |
| 2013/0329576 A1 | 12/2013 | Sinha | | |
| 2014/0003406 A1* | 1/2014 | Kamath | ...... | H04W 76/25 370/338 |
| 2014/0036746 A1* | 2/2014 | Mannemala | ...... | H04W 52/0216 370/311 |
| 2014/0211676 A1* | 7/2014 | Chhabra | ...... | G06F 1/3209 370/311 |
| 2016/0212704 A1* | 7/2016 | Matsunaga | ...... | H04W 52/0238 |

FOREIGN PATENT DOCUMENTS

| | | |
|---|---|---|
| CN | 104054322 A | 9/2014 |
| CN | 104320836 A | 1/2015 |
| CN | 104601203 A | 5/2015 |
| CN | 104756542 A | 7/2015 |
| CN | 104812094 A | 7/2015 |
| CN | 107087283 A | 8/2017 |

\* cited by examiner

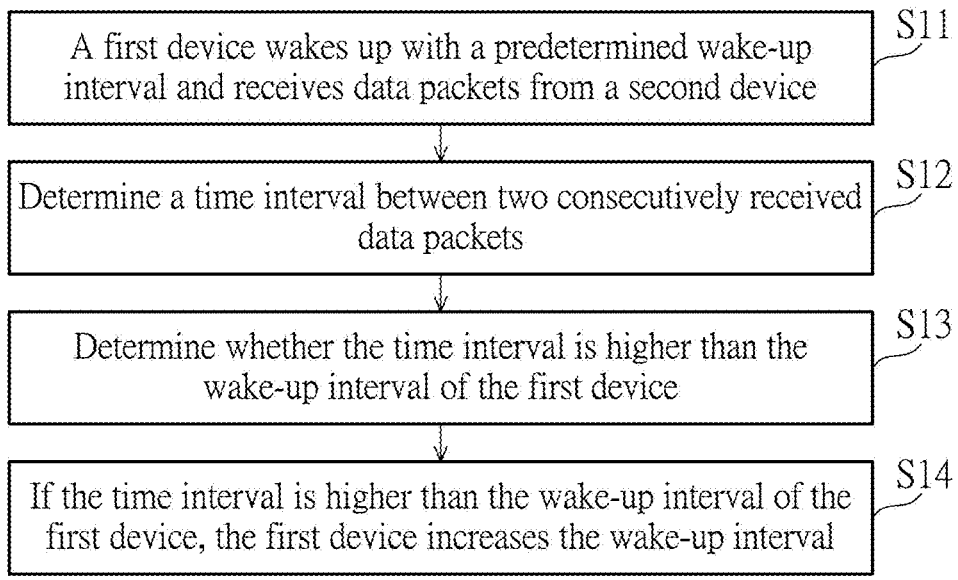
FIG. 1
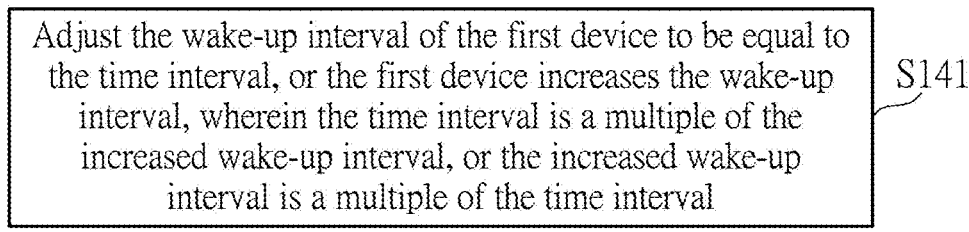
FIG. 2
FIG. 3

| The first device reduces the wake-up interval of the first device by a predetermined value; or the first device reduces the wake-up interval of the first device to an initial value | S251 |

FIG. 10

| The first device reduces the wake-up interval of the first device, so that the reduced value of the wake-up interval of the first device is positively correlated with the number of received/transmitted non-empty packets | S252 |

FIG. 11

The first device wakes up with a wake-up interval and transmits empty packets to the second device — S20

The first device determines whether a number of the empty packets continuously sent to the second device reaches a first threshold value; or the first device determines whether a number of the empty packets continuously received from the second device reaches a first threshold value — S21

Yes

When the number of empty packets continuously sent to the second device reaches the first threshold value, or when the number of empty packets continuously received from the second device reaches the first threshold value, the first device increases the wake-up interval according to a predetermined rule — S22

The first device transmits a request message to the second device — S31

Receive a response message from the second device — S32

Determine whether the second device agrees to use the increased wake-up interval according to the response message of the second device — S33

The first device wakes up with the increased wake-up interval — S34

The first device wakes up with the wake-up interval before increase — S35

WIRELESS COMMUNICATION METHOD AND COMMUNICATION DEVICE

BACKGROUND

The present invention relates to the field of communications, and in particular, to wireless communication methods, and a communication device.

Nowadays, wireless devices produced by wireless device manufacturers on the market do not all follow wireless standards, resulting in a reduced device compatibility. For example, when a master device produced by one wireless device manufacturer transmits a request for increasing a wake-up interval to a slave device produced by another wireless device manufacturer, and the slave device does not agree to increase the wake-up interval, the wake-up interval of the master device cannot be increased. Each time when the master device wakes up, the master device transmits packets to the slave device such that the power consumption of the master device is increased and the performance of the master device is reduced. The wireless standard can be the Bluetooth standard.

SUMMARY

It is therefore one of the objectives of the disclosure to provide a wireless communication method, a communication device, and a device having a storage function, which can reduce the communication power consumption of the wireless device.

In order to solve the above technical problem, a technical solution of the present invention is to provide a wireless communication method, and the method comprises: a first device waking up with a predetermined wake-up interval, and receiving data packets from a second device, wherein the data packet is a packet with a payload or Null packet; determining a time interval between two consecutive data packets received; determining whether the time interval is higher than the wake-up interval of the first device; and if the time interval is higher than the wake-up interval, the first device increasing the wake-up interval.

In order to solve the above technical problem, another technical solution of the present invention is to provide a wireless communication method, and the method comprises: a first device waking up with a predetermined wake-up interval, and transmitting empty packets to a second device; the first device determining whether a number of the empty packets continuously transmitted to the second device reaches a first threshold value; or the first device determining whether a number of the empty packets continuously received from the second device reaches a first threshold value, wherein the empty packet is a packet without a payload; and when the number of the empty packets continuously transmitted to the second device reaches the first threshold value, or when the number of the empty packets continuously received from the second device reaches the first threshold value, the first device increasing the wake-up interval according to a predetermined rule.

In order to solve the above technical problem, another technical solution of the present invention is to provide a wireless communication method, and the method comprises: a first device waking up with a predetermined wake-up interval, and transmitting empty packets to a second device; the first device determining whether a statistical time of continuously transmitting the empty packets to the second device reaches a threshold value; or the first device determining whether a statistical time of continuously receiving the empty packet from the second device reaches a threshold value; and when the statistical time of continuously transmitting the empty packets reaches the threshold value, or when the statistic time of continuously receiving the empty packets reaches the threshold value, the first device increasing the wake-up interval according to a predetermined rule.

In order to solve the above technical problem, another technical solution of the present invention is to provide a communication device, and the communication device comprises: a transceiver and a processor coupled to the transceiver, wherein the processor executes commands for implementing the wireless communication method as described above.

In order to solve the above technical problem, another technical solution of the present invention is to provide a device having a storage function, which stores a command to be executed to implement the wireless communication method as described above.

The beneficial effects of the present invention are as follows. In some embodiments of the present invention, the first device actively increases the wake-up interval of the first device according to the time interval between two consecutive data packets received from the second device, or according to the number of the empty packets continuously transmitted to the second device, or according to the number of the empty packets continuously received from the second device, so that the wake-up interval of the first device is increased, thereby reducing the power consumption of the first device.

These and other objectives of the present invention will no doubt become obvious to those of ordinary skill in the art after reading the following detailed description of the preferred embodiment that is illustrated in the various figures and drawings.

BRIEF DESCRIPTION OF THE DRAWINGS

FIG. 1 is a schematic flow chart of a first embodiment of a wireless communication method according to the present invention.

FIG. 2 is a schematic flow chart of a second embodiment of a wireless communication method according to the present invention.

FIG. 3 is a schematic flow chart of a third embodiment of a wireless communication method according to the present invention.

FIG. 10 is a schematic flowchart of a ninth embodiment of a wireless communication method according to the present invention.

FIG. 11 is a schematic flowchart of a tenth embodiment of a wireless communication method according to the present invention.

FIG. 12 is a schematic flowchart diagram of an eleventh embodiment of a wireless communication method according to the present invention.

DETAILED DESCRIPTION

Figure 4:
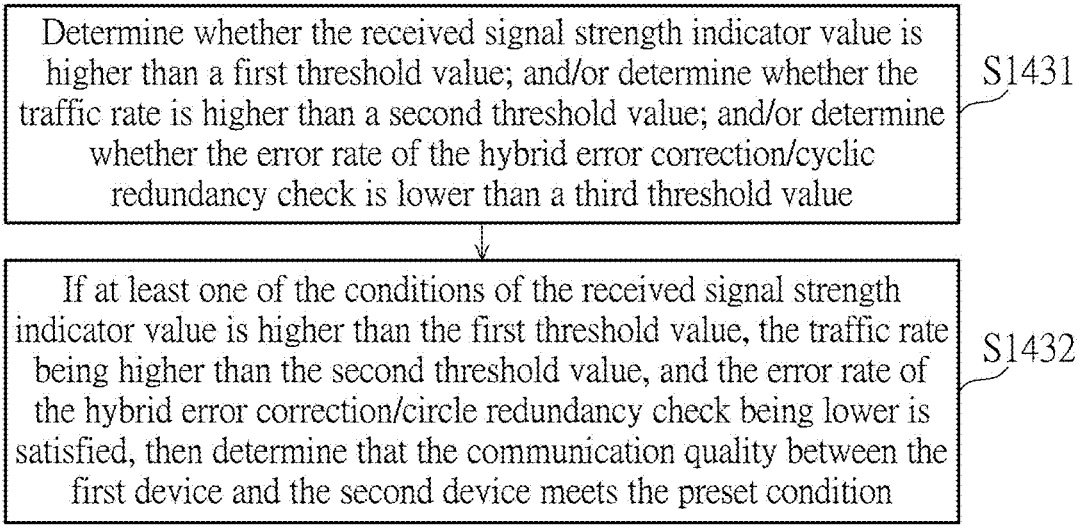
FIG. 4 is a schematic diagram of a specific process of the step S143 in FIG. 3.

The technical solutions in the embodiments of the present invention are clearly and completely described in the following with reference to the drawings in the embodiments of the present invention. It is obvious that the described embodiments are only a part of the embodiments of the present invention, but not all of the embodiments. All other embodiments obtained by a person of ordinary skill in the art based on the embodiments of the present invention without creative efforts fall in the scope of the present invention.

As shown in FIG. 1, a first embodiment of the wireless communication method of the present invention comprises:

S11: A first device wakes up with a predetermined wake-up interval and receives data packets from a second device.

The first device and the second device can be wireless communication devices such as Bluetooth devices, ZigBee devices, etc. In the present invention, the Bluetooth device is taken as an example for description.

When there is communication between two Bluetooth devices, the Bluetooth devices will negotiate a wake-up interval according to the Bluetooth communication protocol, and the Bluetooth devices will be waked up to transmit/receive data packets every a time period, and the time period is the negotiated wake-up interval. When the Bluetooth devices are not waked up and in a sleep state, and the Bluetooth devices cannot receive/transmit the data packets at this time.

The first device is a master device in a Bluetooth system, and the second device is a slave device in the Bluetooth system. The master device is the device that initiates a connection when starting the connection, and is responsible for establishing the connection and a frequency hopping synchronization. A slave device is a device that receives a page from the master device and establishes the connection with the master device.

Specifically, the first device wakes up at a predetermined wake-up interval, and the transceiver of the first device can normally receive/transmit the data packet, wherein the predetermined wake-up interval can be a wake-up interval negotiated with the second device, or can be an initial wake-up interval (for example, 22.5 milliseconds) preset by the system. After the first device wakes up, the first device can receive the data packet transmitted by the second device which is connected with the first device.

S12: Determine a time interval between two consecutive data packets received.

Specifically, in an application example, when the first device receives the data packet from the second device, the time T1, T2, . . . of receiving the data packet can be recorded, and the time interval of receiving two consecutive data packets can be obtained according to the time recorded above. For example, the time interval of receiving two consecutive data packets can be calculated by subtracting T1 from T2, e.g. the time interval equals to the result of subtracting T1 from T2, and the time interval can be regarded as the packet transmission interval of the second device. Of course, in other applications, the first device can also start a timer when receiving a data packet from the second device, and pause a counter when receiving a next data packet from the second device, to obtain the value of the timer, wherein the value is regarded as the time interval.

The two data packets can both be Asynchronous Connection-Less (ACL) packets, or the two data packets can both be Null packets, or one of the two data packets is an ACL packet, and the other one is a Null packet.

S13: Determine whether the time interval is higher than the wake-up interval of the first device.

The wake-up interval of the first device is an initial value specified by the Bluetooth protocol, or a value negotiated with the second device. The value is determined according to the actual situation, and is not specifically limited herein.

S14: If the time interval is higher than the wake-up interval of the first device, the first device increases the wake-up interval.

Specifically, in an application example, when the first device (e.g. master device) produced by one Bluetooth manufacturer transmits a request for increasing the wake-up interval to the second device (e.g. slave device) produced by another Bluetooth manufacturer, the second device does not agree to increase the wake-up interval. However, the second device secretly enters a subrating state without notifying the first device, and the first device is still in a normal working state. The entry of the second device into the subrating state means that the second device wakes up at a predetermined wake-up interval, but does not work, does not transmit a data packet, and transmits a data packet after several/tens of/hundreds of wake-up intervals. In this case, if the wake-up interval of the first device (e.g. the master device) does not increase and transmits data packets to the second device (e.g. the slave device) every time the first device (e.g. the master device) wakes up, the power consumption of the first device (e.g. the master device) will be kept at a higher state. Therefore, in this case, the technical solution provided by the embodiment of the present invention increases the wake-up interval to reduce the power consumption of the first device (e.g. the master device).

In this case, the time interval calculated by the first device is higher than the wake-up interval of the first device, that is, the wake-up interval of the first device is smaller than the packet transmission interval of the second device, so the first device determines that the second device enters a subrating state, and the first device will adjust its own wake-up interval to match with the packet transmission interval of the second device in the subrating state. For example, the wake-up interval of the first device is 22.5 milliseconds, and the calculated time interval is 45 milliseconds. The interval 45 milliseconds is higher than the wake-up interval of the first device by 22.5 milliseconds, and the first device will increase its own wake-up interval. The method for increasing the wake-up interval of the first device comprises: the wake-up interval of the first device is directly increased to be equal to the packet transmission interval of the second device, or is gradually increased to narrow the gap between the packet transmission interval of the second device and the wake-up interval of the first device. For example, the calculated time interval is 450 milliseconds, the wake-up interval of the first device is increased to 225 milliseconds at this time, the wake-up interval of the first device is increased to 450 milliseconds at the next time. Alternatively, the wake-up interval of the first device is adjusted according to the communication quality between the first device and the second device, and it is not specifically limited herein.

In this embodiment, the first device receives the data packet from the second device, and calculates a time interval between the two consecutive data packets received, and adjusts the wake-up interval when the time interval is higher than the wake-up interval of the first device, so as to increase the wake-up interval of the first device, so that the wake-up interval of the first device is enlarged and the power consumption of the first device can be reduced. The first device compares the received time interval between two consecutive data packets with the predetermined wake-up interval, and the first device can determine whether the second device secretly enters the subrating state, and adjusts its own wake-up interval to match with the packet transmission interval of the second device in the subrating state.

Please refer to FIG. 2. FIG. 2 is a schematic flow chart of a second embodiment of a wireless communication method according to the present invention, wherein the second embodiment of the wireless communication method of the present invention is based on the first embodiment of the wireless communication method of the present invention, and further defines that the step S14 comprises:

S141: Adjust the wake-up interval of the first device to be equal to the time interval (that is, the time interval between two consecutive data packets received), or the first device increases the wake-up interval, wherein the time interval is a multiple of the increased wake-up interval, or the increased wake-up interval is a multiple of the time interval.

Specifically, in this embodiment, when the first device determines that the time interval is higher than the wake-up interval of the first device, the first device can directly adjust the wake-up interval to be equal to the time interval, that is, adjust the wake-up interval of the first device to be equal to the wake-up interval of the second device, and the subsequent transmission/reception period of the first device is synchronized with that of the second device, thereby reducing the power consumption of the first device and improving the compatibility between the first device and the second device.

In this embodiment, in order to match the wake-up interval of the first device and the transmission interval of the second device to avoid continuous loss of multiple data packets due to the mismatch, the first device can increase its wake-up interval, and the time interval (that is, the time interval between two consecutive data packets received) is a multiple of the increased wake-up interval, or the increased wake-up interval is a multiple of the time interval (that is, the time between two consecutive packets received). For example, the time interval is 90 milliseconds, and the increased wake-up interval can be 180 milliseconds or 45 milliseconds, etc.

In other embodiments, the first device can also adjust its wake-up interval according to the communication quality between the first device and the second device.

Specifically, as shown in FIG. 3, FIG. 3 is a schematic flow chart of a third embodiment of a wireless communication method according to the present invention, wherein the third embodiment of the wireless communication method of the present invention is based on the first embodiment of the wireless communication method of the present invention, and further defines the step S14 comprises:

S142: Obtain a communication link quality parameter between the first device and the second device.

The communication link quality parameter comprises, but not limited to, a received signal strength indicator (RSSI) value, a traffic rate, and an error rate of a hybrid error correction/cyclic redundancy check.

Specifically, the received signal strength indicator (RSSI) value is used to indicate the strength of the signal received by the first device. If the RSSI value is larger, then the communication link between the first device and the second device has smaller interference, and the communication quality is better. If the RSSI value is smaller, then the communication link between the first device and the second device has larger interference, and the communication quality is worse. The traffic rate is used for indicating the transmission rate of the data packet. If the traffic rate is larger, then the data packet transmission rate is faster, and the channel interference between the first device and the second device is less, and the communication quality is better. The hybrid error correction (HEC) is a polynomial code used to check the error of the header, which can correct a 1 bit error in the header. The cyclic redundancy check (CRC) is a type of hash function that is a short fixed digit check code generated based on the payload in the packet, and is mainly used to detect or verify errors that may occur in the data transmission or after a data storage. If an error rate of the HEC/CRC is lower, then the channel interference between the first device and the second device is less, and the communication quality is better.

S143: Use the communication link quality parameter to determine whether a communication quality between the first device and the second device meets a preset condition.

The preset condition is a condition of a preset communication quality meets a requirement, and the specific condition depends on the actual situation of the adopted communication link parameter, and is not specifically limited herein.

Further, as shown in FIG. 4, FIG. 4 is a schematic diagram of a specific process of the step S143 in FIG. 3, and the step S143 specifically comprises:

S1431: Determine whether the received signal strength indicator value is higher than a first threshold value; and/or determine whether the traffic rate is higher than a second threshold value; and/or determine whether the error rate of the hybrid error correction/cyclic redundancy check is lower than a third threshold value.

The first threshold value, the second threshold value, and the third threshold value are preset threshold values indicating the received signal strength indicator value, the traffic rate, and the error rate of the HEC/CRC meet a corresponding requirement, respectively, and the specific values are determined according to actual requirements, and there is no specific limit here.

S1432: If at least one of the conditions of the received signal strength indicator value being higher than the first threshold value, the traffic rate being higher than the second threshold value, and the error rate of the hybrid error correction/circle redundancy check being lower than the third threshold value is satisfied, then determine that the communication quality between the first device and the second device meets the preset condition.

Specifically, the first device can determine whether a communication quality between the first device and the second device meets a preset condition by determining whether one or more of the three parameters of the received signal strength indicator (RSSI) value, the traffic rate, and the error rate of the HEC/CRC meet the requirement.

For example, the first device determines whether the RSSI value is higher than a first threshold value (for example, −55 dBm), and whether the traffic rate is higher than a second threshold value (for example, 180 kbps). If the RSSI value is higher than −55 dBm, and the traffic rate is higher than 180 kbps, then the first device determines that the communication quality between the first device and the second device meets the preset conditions.

In one embodiment, the error rate of the HEC and the error rate of the CRC are both stability indexes of the error check method in the data packet transmission process, and only one of the parameters is used in this embodiment. In other embodiments, the first device can also determine whether two parameters of the HEC error rate and the CRC error rate both meet corresponding requirements, which are not specifically limited herein.

S144: If the communication quality meets the preset condition, then the first device increases the wake-up interval to a first preset value.

S145: If the communication quality does not meet the preset condition, then the first device increases the wake-up interval to a second preset value.

The difference value between the first preset value and the wake-up interval is higher than a difference value between the second preset value and the wake-up interval, and the specific values of the first preset value and the second preset value can be determined based on the time interval and the wake-up interval of the first device, and are not specifically limited herein. The first preset value and the second preset value can be multiples of a predetermined wake-up interval, respectively.

Specifically, the first device determines that the communication quality between the first device and the second device meets a preset condition. For example, in the above application example, the wake-up interval is 90 milliseconds, the time interval is 450 milliseconds, and the RSSI value is higher than −55 dBm, and the traffic rate is higher than 180 kbps, so the communication quality between the first device and the second device meets the preset condition, and it represents that the communication quality is better, and the first device can increase the wake-up interval to a first preset value (such as 405 milliseconds). If the communication quality between the first device and the second device does not meet the preset condition, for example, the RSSI value is lower than −55 dBm, and the traffic rate is lower than 180 kbps, it represents the communication quality is worse, and it is not proper to increase the wake-up interval of the first device too much. The first device increases the wake-up interval to a second preset value (for example, 225 milliseconds), wherein a difference value between the first preset value 405 milliseconds and the wake-up interval of 90 milliseconds is 315 milliseconds, which is higher than a difference value (135 milliseconds) between the second preset value 225 and the wake-up interval of 90 milliseconds.

In other embodiments, the communication link quality parameter for determining the communication quality can further comprise other parameters such as a channel quality indicator (CQI) and/or a signal to noise ratio, which are not specifically limited herein.

In this embodiment, the first device adjusts the wake-up interval according to the communication quality between the first device and the second device, so as to balance the communication quality and the device power consumption, and avoid the communication quality degradation due to an overlong wake-up interval, and further improve the device performance.

During the communication between two Bluetooth devices, when there is no need to transmit or receive a data packet containing the payload between the two Bluetooth devices, in order to maintain the communication link with the slave device, the master device will periodically transmits an empty packet to the slave device. If the master device transmits a Poll packet, then the slave device transmits a Null packet back to the master device. If the master device transmits a Null packet, then the slave device does not need to send back a data packet, in which both the Poll packet and the Null packet are called empty packets. At this time, the two Bluetooth devices frequently transmit empty packets to each other, or the master device frequently transmits empty packets to the slave device, which easily increases the power consumption of the master device or slave device, and reduces the performance of the master device or slave device.

Figure 5:
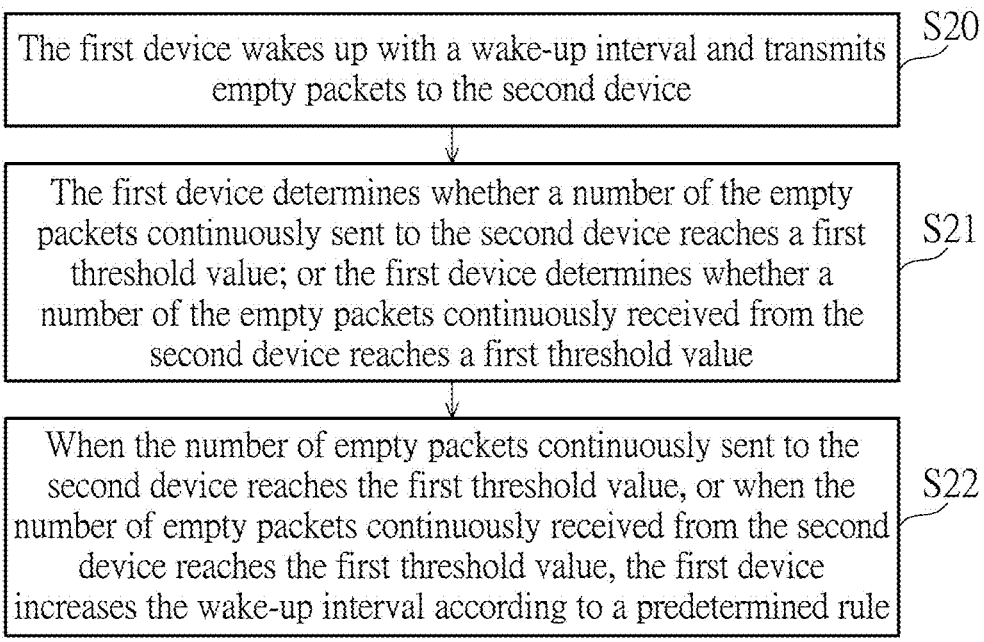
FIG. 5 is a schematic flowchart of a fourth embodiment of a wireless communication method according to the present invention.

Therefore, as shown in FIG. 5, FIG. 5 is a schematic flowchart of a fourth embodiment of a wireless communication method according to the present invention, wherein the fourth embodiment of the wireless communication method of the present invention comprises:

S20: The first device wakes up with a wake-up interval and transmits empty packets to the second device.

Specifically, the first device can wake up with a wake-up interval and transmit empty packets to the second device by using Bluetooth.

The wake-up interval in the step can be referred to as a first wake-up interval, wherein the first wake-up interval is a predetermined wake-up interval or a wake-up interval negotiated by the first device and the second device, or the first wake-up interval is a wake-up interval that matches with a packet transmission interval of the second device in a subrating state, or the first wake-up interval is a wake-up interval increased according to a predetermined rule.

S21: The first device determines whether a number of the empty packets continuously sent to the second device reaches a first threshold value; or the first device determines whether a number of the empty packets continuously received from the second device reaches a first threshold value.

The empty packet type comprises the Poll packet and/or the Null packet, and the first threshold value is a preset threshold value of the number of the continuously received/continuously transmitted empty packets for triggering the first device to adjust the wake-up interval of the first device, and the specific value can be designed according to actual requirements, there is no specific limit here.

S22: When the number of the empty packets continuously sent to the second device reaches the first threshold value, or when the number of the empty packets continuously received from the second device reaches the first threshold value, the first device increases the wake-up interval according to a predetermined rule.

The predetermined rule is a preset rule for increasing the wake-up interval of the first device. For example, increasing the wake-up interval of the first device with a constant interval, or increasing the wake-up interval of the first device with a multiple of the wake-up interval, and the specific rule can be changed according to actual requirements, and there is no specific limit here.

Specifically, in an application embodiment, the first device is a master device in the Bluetooth system, and the second device is a slave device in the Bluetooth system. When the first device and the second device do not need to transmit or receive data packets containing payload, the first device will still transmit a Poll packet to the second device every wake-up interval of 22.5 milliseconds, and the second device will send back a Null packet to the first device every wake-up interval of 22.5 milliseconds. The first device counts the number of the Null packets continuously received from the second device, or counts the number of the Poll packets continuously transmitted to the second device. If the number of the Null packets/Poll packets reaches a threshold value (for example, 5), the first device increases the wake-up interval to be a doubled wake-up interval. In other embodiments, the first device can also continuously transmit Null packets to the second device, or alternatively transmit the Poll packets and the Null packets, and then determine whether the number of the empty packets continuously transmitted to the second device reaches a threshold value. Optionally, the first device can also increase the wake-up interval by a fixed value (for example, 50 milliseconds), or increase the wake-up interval of the first device by a power function or an exponential function or a step function, and there is no specific limit here.

In other embodiments, the first device can be a slave device, and the second device can be a master device, which is not specifically limited herein.

In this embodiment, the first device determines whether a number of the empty packets continuously received from the second device reaches a first threshold value or determines whether a number of the empty packets continuously sent to the second device reaches a first threshold value, and when the number of the empty packets reaches the threshold value, the first device increases the wake-up interval of the first device according to the predetermined rule, so that the wake-up interval of the first device is increased in the low-load condition, thereby reducing the power consumption of the first device and improving the performance of the first device.

Alternatively, in the step S21, the first device can determine whether a statistical time of continuously transmitting the empty packets to the second device reaches a threshold value, or the first device can determine whether a statistical time of continuously receiving the empty packets from the second device reaches a threshold value. In the step S22, when the statistic time of continuously transmitting the empty packet reaches the threshold value, or when the statistic time of continuously receiving the empty packet reaches the threshold value, the first device increases the wake-up interval according to a predetermined rule. Specifically, in an application example, the first device is a master device in the Bluetooth system, and the second device is a slave device in the Bluetooth system. When the first device and the second device do not need to transmit or receive data packets containing payload, the first device will still transmit a Poll packet to the second device every wake-up interval of 22.5 milliseconds, and the second device will send back a Null packet to the first device every wake-up interval of 22.5 milliseconds. The first device obtains the statistics time of continuously transmitting the empty packets, and when the statistics time reaches the threshold value, the first device increases the wake-up interval of the first device.

This embodiment can be combined with the first embodiment of the wireless communication method of the present invention. The execution of the steps in this embodiment can be performed after the step S14, that is, after the wake-up interval matches with the packet transmission interval of the second device in a subrating state, the steps in this embodiment are performed, and the power consumption of the first device can be further reduced.

Figures 6, 7, 8, 9:
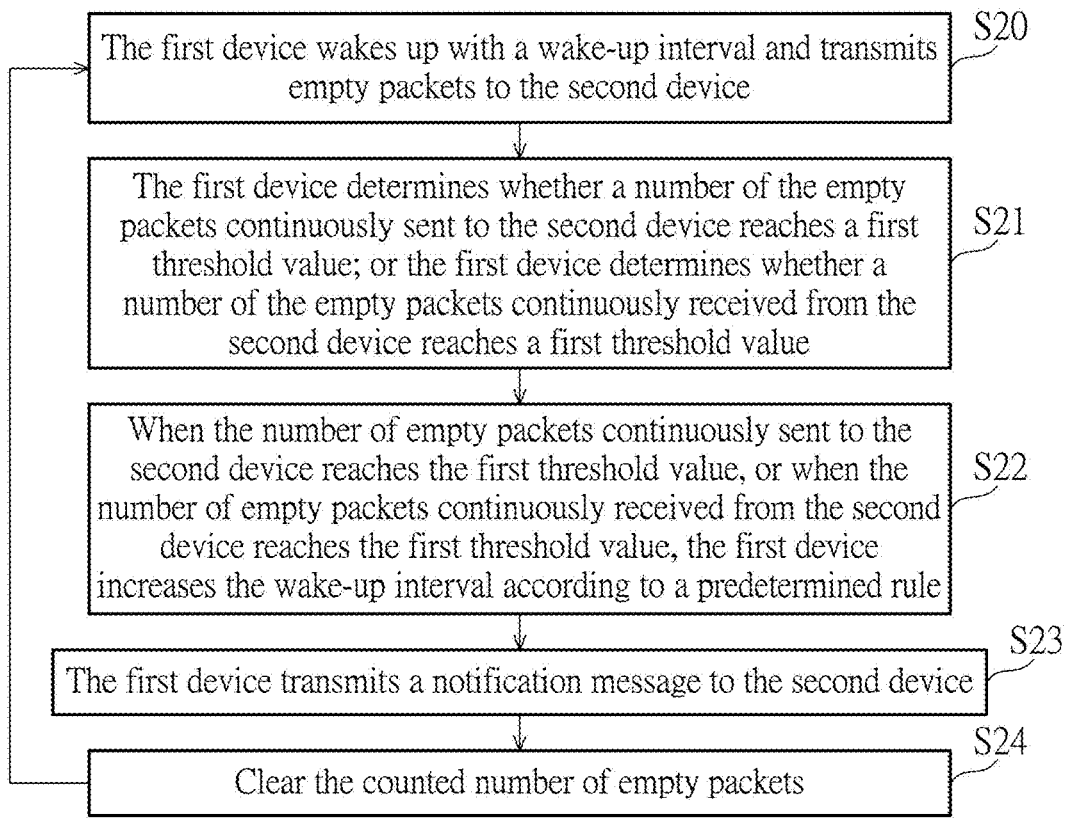
FIG. 6 is a schematic flowchart of a fifth embodiment of a wireless communication method according to the present invention.
FIG. 7 is a schematic flowchart of a sixth embodiment of a wireless communication method according to the present invention.
FIG. 8 is a schematic flowchart of a seventh embodiment of a wireless communication method according to the present invention.
FIG. 9 is a schematic flowchart of an eighth embodiment of a wireless communication method according to the present invention.

As shown in FIG. 6, FIG. 6 is a schematic flowchart of a fifth embodiment of a wireless communication method according to the present invention, wherein the fifth embodiment of the wireless communication method of the present invention is based on the fourth embodiment of the wireless communication method of the present invention. After the step S22, the method further comprises:

S24: The first device clears the counted number of the empty packets, and returns to execute the step S20.

Specifically, in an application example, the first device uses a counter to count the number of the empty packets continuously received from the second device, or counts the number of the empty packets continuously transmitted to the second device. When the counter value reaches the first threshold value (for example, the counter value is equal to 5), the first device increases its wake-up interval according to a predetermined rule, and then clears the counted number of the counter, and then restarts to use the counter to count the number of the empty packets continuously transmitted/received, and performs the step S20. Then, the next time when the counted number reaches the threshold value (for example, 5), the first device continues to increase its wake-up interval according to a predetermined rule. For example, the first device doubles its wake-up interval this time, and the doubled wake-up interval is continuously doubled next time. Alternatively, each time the current wake-up interval is increased by a predetermined value, wherein the predetermined value can be a predetermined wake-up interval such as 22.5 milliseconds.

Optionally, in another embodiment, the first device wakes up with the increased wake-up interval, and when the number of the empty packets continuously transmitted to the second device by the first device with the increased wake-up interval reaches a second threshold value, or when the number of the empty packets continuously received from the second device by the first device with the increased wake-up interval reaches a second threshold value, the first device continues to increase the wake-up interval of the first device according to a predetermined rule, wherein the second threshold value is not equal to the first threshold value. That is, in another embodiment, the threshold value that triggers the increase of the wake-up interval can be different.

Optionally, in other embodiments, the first device is also able to not clear the counted number of the empty packets, but to increase the wake-up interval of the first device and double the threshold value according to a predetermined rule when the number of the continuously received/transmitted empty packets reaches the threshold value. Alternatively, the threshold value also can be increased according to the actual requirements, which is not specifically limited herein.

Optionally, as shown in FIG. 6, after step S22, the method further comprises:

S23: The first device transmits a notification message to the second device.

The request message is used to notify the second device to adjust the wake-up interval of the second device to be equal to the wake-up interval of the first device.

Specifically, in an application example, after the first device increases the wake-up interval of the first device according to a predetermined rule, the first device transmits a notification message to the second device, and after receiving the notification message, the second device adjusts the wake-up interval of the second device to be equal to the wake-up interval of the first device, so that the compatibility between the first device and the second device can be improved. Then, the first device proceeds to the step S24, clears the counted number of the empty packets and returns to the step of the first device receiving the empty packets from the second device.

Optionally, as shown in FIG. 7, FIG. 7 is a schematic flowchart of a sixth embodiment of a wireless communication method according to the present invention, wherein the sixth embodiment of the wireless communication method of the present invention is based on the fourth embodiment of the wireless communication method of the present invention, and the step S22 specifically comprises:

S221: The first device increases the wake-up interval of the first device by a predetermined value.

The predetermined value is a value that is set in advance to increase the wake-up interval of the first device. The specific value can be determined according to the actual situation, and is not specifically limited herein.

For example, each time when the number of the empty packets continuously received from the second device by the first device reaches a threshold value, or each time when the number of the empty packets continuously transmitted by the first device to the second device reaches a threshold value, the first device increases the wake-up interval by a predetermined value, wherein the predetermined value can be a multiple of a predetermined wake-up interval, such as 45 milliseconds or 22.5 milliseconds.

In other embodiments, the increase value used to increase wake-up interval of the first device by the first device according to a predetermined rule can also be incremental.

As shown in FIG. 8, FIG. 8 is a schematic flowchart of a seventh embodiment of a wireless communication method according to the present invention, wherein the seventh embodiment of the wireless communication method of the present invention is based on the fourth embodiment of the wireless communication method of the present invention, and the step S22 specifically comprises:

S222: If the number of the continuously received empty packets from the second device reaches a threshold value, or the number of the consecutive empty packets transmitted to the second device reaches a threshold value, the first device increases the wake-up interval of the first device, so that the increase value of the wake-up interval of the first device is positively correlated with the statistical quantity/statistic time of the continuously received/continuously transmitted empty packets.

The increase value of the wake-up interval of the first device is a difference value between the wake-up interval of the first device after the current increase and the wake-up interval of the first device before the current increase. The statistical quantity and/or the statistical time of the continuously received/continuously transmitted empty packets is the statistical quantity and/or statistical time of the continuously received/continuously transmitted empty packets after the previous increase of the wake-up interval of the first device.

For example, the wake-up interval of the first device before the increase is 22.5 milliseconds, and the first time when the first device counts that the number of the empty packets continuously received from the second device reaches 5, or the first time when the first device counts that the number of the empty packets continuously transmitted to the second device reaches 5, the first device increases the wake-up interval of the first device by 22.5 milliseconds, that is, the wake-up interval is increased to 45 milliseconds, and the number of the continuously received/continuously transmitted empty packets is 5.

The second time when the first device recounts that the number of the empty packets continuously received from the second device reaches 10, or the second time when the first device recounts that the number of the empty packets continuously transmitted to the second device reaches 10, the first device increases the wake-up interval of the first device by 45 milliseconds (which is double of the previous wake-up interval), that is, the wake-up interval is increased to 90 milliseconds, so that the increase value of the wake-up interval of the first device is positively correlated with the statistical number of the continuously received/continuously transmitted empty packets. Specifically, the wake-up interval of the first device can be doubled when the statistical quantity is doubled, or the specific growth trend can be a power function or an exponential function or a step function, etc., which is not specifically limited herein.

Of course, in other embodiments, the longer the statistical time of the empty packets continuously received/continuously transmitted by the first device is, the larger the increase value of the wake-up interval of the first device is, and the specific increase value can be set according to actual requirements, and no specific restrictions are made.

In addition, it can be understood that the difference value between the increased wake-up interval of the first device and the first wake-up interval of the first device is positively correlated with the statistical quantity and/or statistical time of continuously received/continuously transmitted empty packets, wherein the statistical number and/or statistical time of the continuously received/continuously transmitted empty packets is a statistical number and/or statistical time of empty packets continuously received/continuously transmitted after the first device wakes up with the first wake-up interval. The first wake-up interval is a predetermined wake-up interval, or an adjusted wake-up interval matched with a packet transmission interval of the second device in the subrating state, or an increased wake-up interval according to a predetermined rule. Continuing with the above example as an example, assuming that the first wake-up interval is 22.5 milliseconds and the first statistical number is 5, then the first increase is 22.5 milliseconds and the first increased wake-up interval is 45 milliseconds. The number of the empty packets is continued to count, and when the number of the empty packets reaches 15, the wake-up interval is secondly increased and the second increased wake-up interval is 90 milliseconds, wherein the second increased wake-up interval is larger than the first wake-up interval by 67.5 milliseconds.

As shown in FIG. 9, FIG. 9 is a schematic flowchart of an eighth embodiment of a wireless communication method according to the present invention, wherein the eighth embodiment of the wireless communication method of the present invention is based on the fifth embodiment of the wireless communication method of the present invention, and further comprises:

S25: When the first device receives the non-empty packet from the second device, or when the first device transmits the non-empty packet to the second device, the first device decreases the wake-up interval of the first device.

The non-empty packet is a data packet containing a payload, such as an Asynchronous Connection-Less (ACL) packet.

Specifically, the first device is waken up, and during the process of transmitting and receiving a data packet, when the first device receives the non-empty packet from the second device, or the first device transmits the non-empty packet to the second device, the first device and the second device need to transmit/receive a data packet comprising the payload. At this time, the first device decreases the wake-up interval until the wake-up interval becomes the initial value of the first device wake-up interval, thereby improving the communication efficiency. For example, each time when the first device receives a non-empty packet from the second device, the first device decreases the wake-up interval of the first device until it is decreased to an initial value (for example, 22.5 milliseconds), or each time when the first device receives a non-empty packet from the second device, the first device decreases the wake-up interval by a predetermined interval (such as a predetermined wake-up interval, for example, 22.5 milliseconds), or the first device directly decreases the wake-up interval to a predetermined wake-up interval when the first device receives a non-empty packet, or each time when the first device receives a non-empty packet from the second device, the value of each decrease is larger than the value of the previous decrease. For example, the value of current decrease is 45 milliseconds, and the value of next decrease is 90 milliseconds, wherein the decreasing trend can be a power function or an exponential function or a step function, etc. Alternatively, the value of each decrease is smaller than the value of the previous decrease. This is depending on the actual situation, and there is no specific limit here. If the non-empty packet from the second device is not received, or the non-empty packet is not transmitted to the second device, the first device continues to determine whether the number of the empty packets continuously received from the second device reaches the threshold value, or continues to determine whether the number of the empty packets continuously transmitted to the second device reaches the threshold value.

The step S25 of the present embodiment can be performed before the step S20 or the step S23, or can be after the step S21 determines the number of the continuously received/transmitted empty packets is lower than the threshold value, which is not specifically limited herein.

Optionally, as shown in FIG. 10, FIG. 10 is a schematic flowchart of a ninth embodiment of a wireless communication method according to the present invention, wherein the ninth embodiment of the wireless communication method of the present invention is based on the eighth embodiment of the wireless communication method of the present invention, and the step S25 specifically comprises:

S251: The first device decreases the wake-up interval of the first device by a predetermined value, or the first device decreases the wake-up interval of the first device to an initial value.

The predetermined value is a preset decrease value used to decrease the wake-up interval of the first device by the first device each time. The specific value can be determined according to an actual situation, and is not specifically limited herein. The initial value is an initial value according to a wireless protocol, and can also be the wake-up interval after the negotiation between the first device and the second device, and is not specifically limited herein.

Specifically, when the first device receives a non-empty packet from the second device, for example, an Asynchronous Connection-Less (ACL) packet, or the first device transmits a non-empty packet to the second device, the first device will decrease its wake-up interval by a predetermined value, such as 45 milliseconds, or the first device directly decreases its wake-up interval to an initial value, such as 22.5 milliseconds. In other embodiments, the decrease value of the first device used to decrease its wake-up interval can also be incremental.

For details, please refer to FIG. 11. FIG. 11 is a schematic flowchart of a tenth embodiment of a wireless communication method according to the present invention, wherein the tenth embodiment of the wireless communication method of the present invention is based on the eighth embodiment of the wireless communication method of the present invention. Step S25 specifically comprises:

S252: The first device decreases the wake-up interval of the first device, so that the decrease value of the wake-up interval of the first device is positively correlated with the number of the received/transmitted non-empty packets.

The decrease value of the wake-up interval of the first device is a difference value between the wake-up interval of the first device before the current decrease and the wake-up interval of the first device after the current decrease. The number of the received/transmitted non-empty packets is the number of the non-empty packets received/transmitted after the previous decrease of the wake-up interval.

Specifically, when the first device is waken up and transmits and receives a data packet, if the first device receives a non-empty packet from the second device, or the first device transmits a non-empty packet to the second device, the first device decreases the wake-up interval of the first device, and the decrease value is positively correlated with the number of the received/transmitted non-empty packets. That is, when the first device receives more non-empty packets, it means that the first device and the second device need to transmit more information, and the wake-up interval of the first device is smaller. For example, during the process of the first device being waken up and transmitting/receiving the data packet, the first time when the first device receives a non-empty packet from the second device, or the first time when the first device transmits a non-empty packet to the second device, the wake-up interval of the first device is decreased by 22.5 milliseconds, and the number of the received/transmitted non-empty packet is 1. When the first device is waken up next time (that is, with the wake-up interval after the last decrease), when the first device receives 2 non-empty packet from the second device with the current wake-up interval, or when the first device transmits 2 non-empty packet to the second device with the current wake-up interval, the wake-up interval of the first device is decreased by 45 milliseconds. Optionally, the decrease value of the wake-up interval of the first device can also be larger and larger until the wake-up interval is decreased to the initial value, and the specific growth trend of the decrease value can be a power function or an exponential function or a step function, etc., which is not specifically limited herein.

Referring to FIG. 12, FIG. 12 is a schematic flowchart diagram of an eleventh embodiment of a wireless communication method according to the present invention. In this embodiment, the first device is a slave device and the second device is a master device, or the first device is a master device and the second device is a slave device. As shown in FIG. 12, FIG. 12 is similar to FIG. 6, except that after step the S22, the method further comprises:

S31: The first device transmits a request message to the second device.

The request message is used to request the second device to increase the wake-up interval. For example, the request message indicates the increased wake-up interval, such as 90 milliseconds.

Specifically, the first device counts the number of the empty packets that are continuously transmitted to the second device, or counts the number of the empty packets that are continuously received from the second device, and when the number of the continuously transmitted/received empty packets reaches a threshold value, the first device firstly increases the wake-up interval of the first device. After it is stable, the first device transmits a request message for increasing the wake-up interval to the second device. After the second device receives the request message, the second device transmits a response message of whether the second device agrees to the first device.

S32: Receive a response message from the second device.

S33: Determine whether the second device agrees to increase the wake-up interval and use the increased wake-up interval according to the response message of the second device, for example, whether the second device agrees to adjust the wake-up interval of the second device to be the increased wake-up interval.

S34: If the second device agrees to increase the wake-up interval, the first device wakes up with the increased wake-up interval.

S35: If the second device does not agree, the first device wakes up with the wake-up interval before the increase.

Specifically, in an embodiment, the first device can obtain information of whether the second device agrees to the request according to the response message of the second device, and if the second device agrees to the request, the first device uses the increased wake-up interval and returns to continue the step S20. If the second device does not agree with the request, the first device wakes up with the wake-up interval before the increase. The execution of the steps in this embodiment can also be performed before step S22.

In other embodiments, when the first device is a master device and the second device is a slave device, if the second device does not agree the request to increase the wake-up interval, the first device can still wake up with the increased wake-up interval, and continue the step S20 to continue to increase the wake-up interval when the number of the continuously received/transmitted empty packets reaches the first/second threshold value, so as to further reduce power consumption. Alternatively, when the second device does not agree the request, the first device abandons the increased wake-up interval and wakes up with the wake-up interval before the increase. In addition, the step of the first device transmitting the request message to the second device can also be performed before the step S22.

Figure 13:
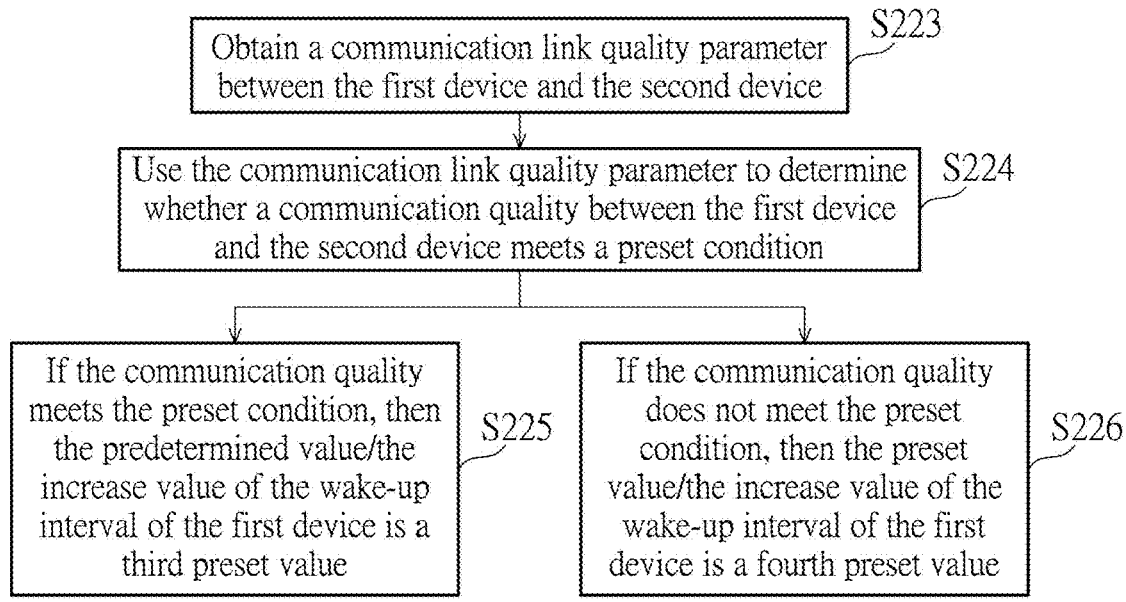
FIG. 13 is a schematic flowchart of a twelfth embodiment of a wireless communication method according to the present invention.

As shown in FIG. 13, FIG. 13 is a schematic flowchart of a twelfth embodiment of a wireless communication method according to the present invention, and the step S22 further comprises:

S223: Obtain a communication link quality parameter between the first device and the second device.

The communication link quality parameters comprise, but are not limited to, a received signal strength indicator value, a traffic rate, and an error rate of a HEC/CRC.

S224: Use the communication link quality parameter to determine whether a communication quality between the first device and the second device meets a preset condition.

The preset condition is a condition that the communication quality meets the requirement set in advance, and the specific condition depends on the actual situation of the adopted communication link parameter, and is not specifically limited herein.

For a specific process of determining the relationship between the parameters and the communication quality, and determining whether the communication quality between the first device and the second device meets the preset condition, please refer to the third embodiment of the wireless communication method of the present invention, and details are not described herein again.

S225: If the communication quality meets the preset condition, then the predetermined value/the increase value of the wake-up interval of the first device is a third preset value.

S226: If the communication quality does not meet the preset condition, then the preset value/the increase value of the wake-up interval of the first device is a fourth preset value.

The third preset value is higher than the fourth preset value, and the specific values of the third preset value and the fourth preset value can be determined according to actual requirements, and are not specifically limited herein.

Specifically, the first device determines that the communication quality between the first device and the second device meets a preset condition. For example, if the RSSI value is higher than −55 dBm, and the error rate of the hybrid error correction/cyclic redundancy check is lower than 5%, the communication quality between the first device and the second device meets the preset condition, and it indicates that the communication quality is better, and the first device can increase the wake-up interval by a larger amount, such as increasing 225 milliseconds. If the communication quality between the first device and the second device does not meet the preset condition, for example, the RSSI value is lower than −55 dBm, or the error rate of the hybrid error correction/cyclic redundancy check reaches 5%, the communication quality is worse, and it is not proper to increase the wake-up interval of the first device too much. The first device increases the wake-up interval by 225 milliseconds.

In other embodiments, the communication link quality parameter for determining the communication quality can further comprise other parameters such as a channel quality indicator (CQI) and/or a signal to noise ratio, which are not specifically limited herein. In another embodiment, the first device can also determine that whether the communication quality between the first device and the second device meets a preset condition by simultaneously determining the error rate of the hybrid error correction and the error rate of cyclic redundancy check.

In this embodiment, the first device adjusts the wake-up interval according to the communication quality between the first device and the second device, so as to balance the communication quality and the power consumption of the first device, and avoid the communication quality degradation due to overlong wake-up interval, and further improve the performance of the first device.

Figure 14:
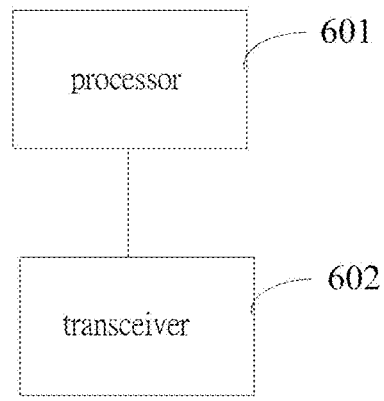
FIG. 14 is a schematic structural diagram of an embodiment of a communication device of the present invention.

As shown in FIG. 14, an embodiment 60 of the communication device of the present invention comprises: a processor 601 and a transceiver 602, wherein the transceiver 602 is coupled to the processor 601.

The transceiver 602 is configured to receive or transmit a data packet, and is an interface that the communication device 60 communicates with other wireless devices.

The processor 601 is configured to execute commands to control the operation of the communication device, and the processor 601 can also be referred to as a central processing unit (CPU). The processor 601 can be an integrated circuit chip with signal processing capabilities. The processor 601 can also be a general purpose processor, a digital signal processor (DSP), an application integrated circuit (ASIC), an field programmable gate array (FPGA), or other programmable logic device, a discrete gate, a transistor logic device, or a discrete hardware component. The general purpose processor can be a microprocessor or the processor can be any conventional processor.

The processor 601 is configured to execute commands to implement the method provided by any one of the first to twelfth embodiments of the wireless communication method of the present invention and any non-conflicting combination. Of course, in other embodiments, the communication device 60 can further comprise other components such as a memory (not shown). The processor 601 and the transceiver 602 can also be integrated into one chip, which is not specifically limited herein.

In this embodiment, the communication device 60 can be a Bluetooth chip, or can be a communication device with Bluetooth functions, etc. The communication device 60 can be a master device in the Bluetooth system or a slave device in the Bluetooth system in a specific implementation.

Figure 15:
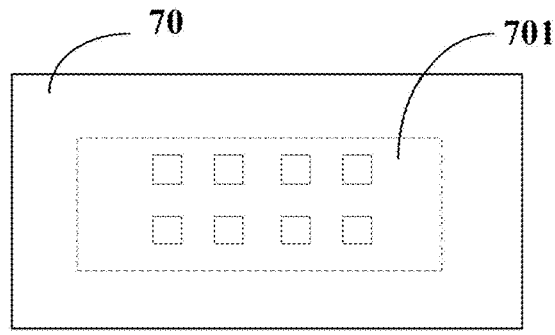
FIG. 15 is a schematic structural diagram of an embodiment of a device having a storage function according to the present invention.

As shown in FIG. 15, FIG. 15 is a schematic structural diagram of an embodiment of an apparatus 70 having a storage function according to the present invention. The device 70 having a storage function stores a command 701, which can implement any one of the first to twelfth embodiments of the wireless communication methods of the present invention and any non-conflicting combination when executed by the processor.

The device 70 having a storage function can be a portable storage medium such as a USB flash drive, an optical disk, or a terminal device or a server.

Those skilled in the art will readily observe that numerous modifications and alterations of the device and method can be made while retaining the teachings of the invention. Accordingly, the above disclosure should be construed as limited only by the metes and bounds of the appended claims.

What is claimed is:

1. A wireless communication method performed in Bluetooth system, comprising:
  a first device in the Bluetooth system waking up periodically according to a predetermined time period, and receiving data packets from a second device;
  determining a packet transmission interval of the second device based on the received data packets, wherein the packet transmission interval of the second device is a multiple of the predetermined time period;
  determining whether the packet transmission interval is higher than the predetermined time period; and
  if the packet transmission interval of the second device is higher than the predetermined time period, the first device increasing the predetermined time period, wherein the increased predetermined time period is equal to the packet transmission interval of the second device, or the packet transmission interval of the second device is a multiple of the increased predetermined time period, or the increased predetermined time period is a multiple of the packet transmission interval of the second device.

2. The wireless communication method of claim 1, wherein the step of the first device increasing the predetermined time period further comprises:
  obtaining a communication link quality parameter between the first device and the second device;
  using the communication link quality parameter to determine whether a communication quality between the first device and the second device meets a preset condition; and
  if the communication quality meets the preset condition, then the first device increasing the predetermined time period to a first preset value;
  if the communication quality does not meet the preset condition, the first device increasing the predetermined time period to a second preset value;
  wherein a difference value between the first preset value and the predetermined time period is higher than a difference value between the second preset value and the predetermined time period.

3. The wireless communication method of claim 2, wherein the communication link quality parameter comprises at least one of a received signal strength indicator value, a traffic rate, and an error rate of a hybrid error correction/cyclic redundancy check.

4. The wireless communication method of claim 3, wherein the step of using the communication link quality parameter to determine whether a communication quality between the first device and the second device meets a preset condition further comprises:
  performing at least one of the following determining operations: determining whether the received signal strength indicator value is higher than a first threshold value; determining whether the traffic rate is higher than a second threshold value; determining whether the error rate of the hybrid error correction/cyclic redundancy check is lower than a third threshold value; and
  if at least one of the conditions of the received signal strength indicator value being higher than the first threshold value, the traffic rate being higher than the second threshold value, and the error rate of the hybrid error correction/circle redundancy check being lower than the third threshold value is satisfied, then determining that the communication quality between the first device and the second device meets the preset condition.

5. The wireless communication method of claim 1, wherein the first device is a master device, the second device is a slave device, and the increased predetermined time period matches with the packet transmission interval of the second device in a subrating state.

6. A communication device, comprising:
  a transceiver, configured to receive and/or transmit a data package; and
  a processor, coupled to the transceiver, configured to execute commands for implementing the wireless communication method of claim 1.

7. The wireless communication method of claim 1, wherein the packet transmission interval of the second device is a wake-up interval of the second device, wherein the wake-up interval comprises a difference between consecutive time instances in which the second device wakes up to communicate with the first device.

8. A wireless communication method performed in Bluetooth system, comprising:
  a first device in the Bluetooth system waking up periodically according to a predetermined time period in a power saving mode, and transmitting empty packets to a second device, wherein each of the empty packets is a packet without a payload in Bluetooth protocol;
  the first device increasing the predetermined time period used in the power saving mode according to a predetermined rule when at least one of following conditions is met:
  the first device determining that the number of the empty packets continuously transmitted to the second device reaches a first threshold value;
  the first device determining that the number of the empty packets continuously received from the second device reaches a second threshold value;
  the first device determining that a statistical time of continuously transmitting empty packets to the second device reaches a third threshold value; and
  the first device determining that a statistical time of continuously receiving empty packets from the second device reaches a fourth threshold value;

wherein the step of the first device increasing the predetermined time period according to the predetermined rule further comprises:
   obtaining a communication link quality parameter between the first device and the second device;
   using the communication link quality parameter to determine whether a communication quality between the first device and the second device meets a preset condition; and
   if the communication quality meets the preset condition, increasing the predetermined time period by a third preset value;
   if the communication quality does not meet the preset condition, increasing the predetermined time period by a fourth preset value, wherein the third preset value is higher than the fourth preset value.

9. The wireless communication method of claim 8, wherein after the first device increases the predetermined time period according to a predetermined rule, the method further comprises:
   the first device waking up according to the increased predetermined time period, and transmitting empty packets to the second device;
   when the first device wakes up according to the increased predetermined time period so that the number of the empty packets continuously transmitted to the second device reaches a fifth threshold value, or when the first device wakes up according to the increased predetermined time period so that the number of empty packets continuously received from the second device reaches a sixth threshold value, the first device continuing to increase the predetermined time period according to the predetermined rule, wherein the fifth threshold value is equal to the first threshold value, or the fifth threshold value is not equal to the first threshold value, and the sixth threshold value is equal to the second threshold value or not equal to the second threshold value.

10. The wireless communication method of claim 8, wherein the step of the first device increasing the predetermined time period of the first device according to a predetermined rule further comprises:
   the first device increasing the predetermined time period so that the increase value of the predetermined time period is positively correlated with the statistical quantity or statistical time of the continuously received/continuously transmitted empty packets;
   wherein the increase value of the predetermined time period is a difference value between the predetermined time period after currently increased and the predetermined time period before currently increased; and the statistics quantity or statistical time of the continuously received/continuously transmitted empty packets is a statistical quantity or a statistical time of the empty packets continuously received/continuously transmitted after the predetermined time period is previously increased.

11. The wireless communication method of claim 8, wherein the step of the first device waking up periodically according to the predetermined time period and transmitting empty packets to the second device further comprises:
   the first device waking up according to a first time period, and transmitting the empty packets to the second device, wherein a difference value between the increased predetermined time period and the first time period is positively correlated to a statistical quantity or a statistical time of the continuously received/continuously transmitted empty packets, wherein the statistics quantity or statistical time of the continuously received/continuously transmitted empty packets is a statistical quantity or a statistical time of the empty packets continuously received/continuously transmitted after the first device waking up according to the first time period.

12. The wireless communication method of claim 11, wherein the first time period is an adjusted time period that matches with a packet transmission interval of the second device in a subrating state, or a time period increased according to a predetermined rule.

13. The wireless communication method of claim 8, wherein after the first device increases the predetermined time period according to a predetermined rule, the method further comprises:
   the first device transmitting a request message to the second device, wherein the request message is used to notify the second device to adjust the time period of the second device to be equal to the time period of the first device interval.

14. The wireless communication method of claim 8, wherein after the first device increases the predetermined time period according to a predetermined rule, the method further comprises:
   the first device transmitting a request message to the second device, wherein the request message indicates the increased predetermined time period;
   receiving a response message from the second device;
   determining whether the second device agrees to use the increased predetermined time period according to the response message of the second device;
   if the second device agrees to use the increased predetermined time period, the first device waking up according to the increased predetermined time period; and
   if the second device does not agree to use the increased predetermined time period, the first device waking up according to the predetermined time period, or the first device waking up according to the increased predetermined time period.

15. The wireless communication method of claim 8, further comprising:
   when the first device receives a non-empty packet from the second device, the first device decreasing the predetermined time period; or
   when the first device transmits a non-empty packet to the second device, the first device decreasing the predetermined time period.

16. The wireless communication method of claim 15, wherein the step of the first device decreasing the predetermined time period further comprises:
   the first device decreasing the predetermined time period by a predetermined value; or
   the first device decreasing the predetermined time period to an initial value.

17. The wireless communication method of claim 15, wherein the step of the first device decreasing the predetermined time period further comprises:
   the first device decreasing the predetermined time period so that a decrease value of the predetermined time period is positively correlated with a statistic quantity of the received/transmitted non-empty packets;
   wherein the decrease value of the predetermined time period is a difference value between the predetermined time period before currently decreased and the predetermined time period after currently decreased.

18. The wireless communication method of claim 8, wherein the communication link quality parameter comprises at least one of a received signal strength indicator value, a traffic rate, and an error rate of a hybrid error correction/cyclic redundancy check.

19. The wireless communication method of claim 18, wherein the step of using the communication link quality parameter to determine whether a communication quality between the first device and the second device meets a preset condition further comprises:

performing at least one of the following determining operations: determining whether the received signal strength indicator value is higher than a first threshold value; determining whether the traffic rate is higher than a second threshold value; determining whether the error rate of the hybrid error correction/cyclic redundancy check is lower than a third threshold value; and if at least one of the conditions of the received signal strength indicator value is higher than the first threshold value, the traffic rate is higher than the second threshold value, and the error rate of the hybrid error correction/circle redundancy check is lower than the third threshold value is satisfied, then determining that the communication quality between the first device and the second device meets the preset condition.

\* \* \* \* \*